May 29, 1928.  1,671,410
C. M. CRONKHITE
RECOIL MECHANISM
Filed Oct. 29, 1925
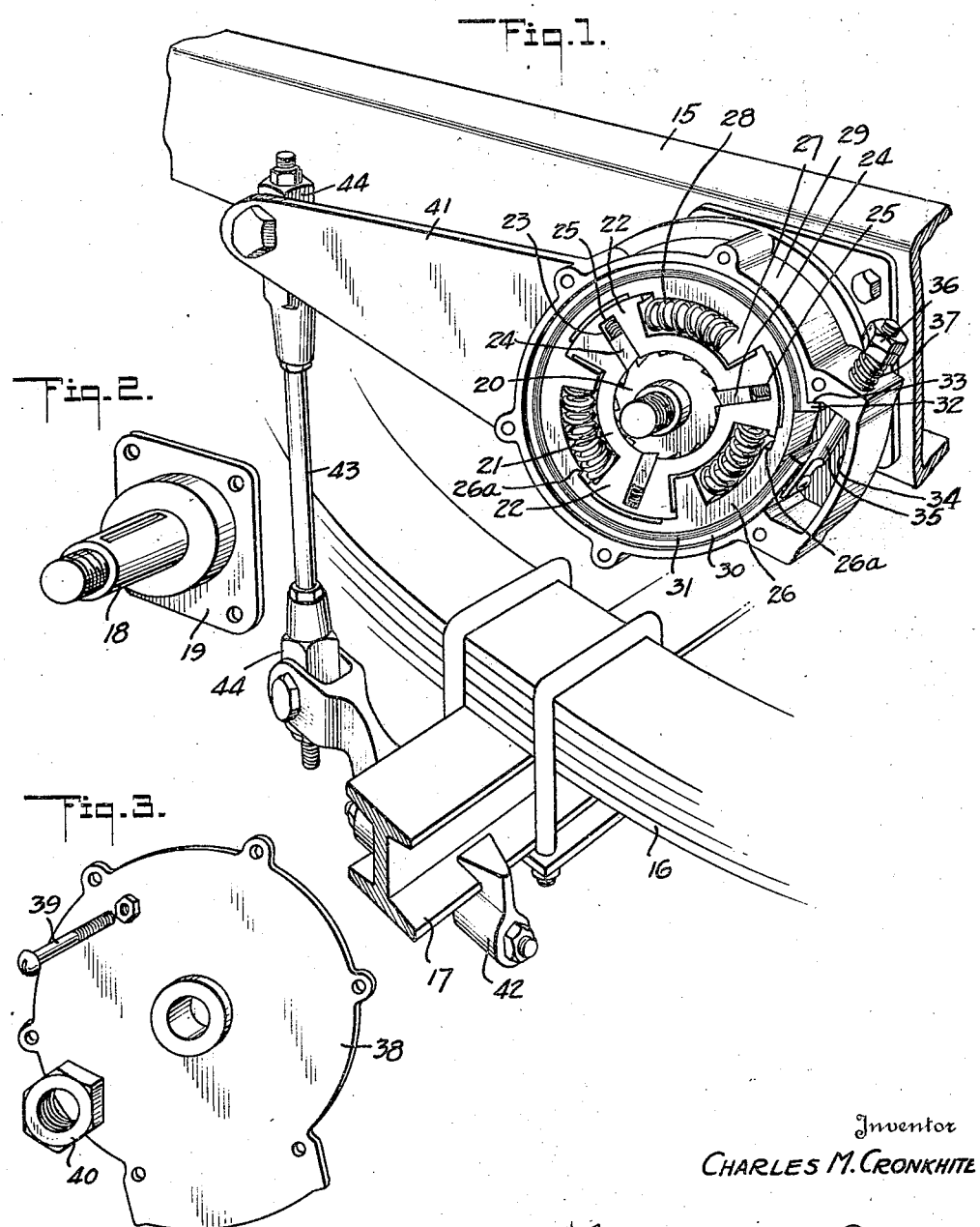
Inventor
CHARLES M. CRONKHITE
By Munn & Co.
Attorney Patented May 29, 1928.

1,671,410

UNITED STATES PATENT OFFICE.

CHARLES M. CRONKHITE, OF GLENDALE, CALIFORNIA.

RECOIL MECHANISM.

Application filed October 29, 1925. Serial No. 65,614.

My invention relates to recoil mechanisms of the character embodied in my co-pending application Serial No. 50,918, filed August 18, 1925, and a purpose of my invention is the provision of a recoil mechanism which is designed and operable to eliminate the sudden checking of the upward rebounding movement of a vehicle body and the attendant objections existing in the recoil mechanism embodied in my aforesaid application, and by interposing a yieldable connection between the ratchet member and the ratchet collar or brake drum, which functions to permit movement of the brake drum independently of the ratchet member, but which is yieldingly resisted by the connection so as to retard such movement of the drum, thereby graduating the checking action of the mechanism and allowing the vehicle body to rise to its normal elevation without jerking movement.

I will describe only one form of recoil mechanism embodying my invention, and will then point out the novel features thereof in claims.

In the drawings

Figure 1 is a view showing in perspective one form of recoil mechanism embodying my invention in applied position to a vehicle, the cover of the mechanism being removed to show parts not otherwise revealed;

Figure 2 is a view showing in perspective the fixed bearing member of the mechanism shown in Figure 1;

Figure 3 is a perspective view showing the cover, nuts and bolts for securing the cover in place.

Referring specifically to the drawings, my invention in its present embodiment is shown applied to the frame 15 of a motor vehicle, one of the springs of the vehicle being indicated at 16, and the front axle at 17. The recoil mechanism comprises a bearing member 18 having an attaching flange 19, by which the member can be rigidly secured to the frame 15 to extend horizontally from the outer side thereof. Keyed to the bearing member is a toothed ratchet member 20, and surrounding the ratchet member is a collar 21 having circumferentially spaced radial enlargements or projections 22 formed with pockets 23 opening inwardly and slidably receiving dogs 24 which are normally urged inwardly for engagement with the ratchet member by means of springs 25. These dogs all extend in the same direction with respect to the ratchet member so as to permit free rotation of the collar on the member in one direction but to lock the collar against movement in the other direction.

Surrounding the collar 21 is a brake drum 26 having a smooth outer periphery but provided on its rear periphery at circumferentially spaced points with enlargements or projections 27. The arrangement of the projections 27 is such that each projection is disposed between any two adjacent projections 22 of the collar 21, and interposed between each projection of the drum and one of the projections of the collar is a coiled expansible spring 28. In the present instance, I have shown the collar and drum each provided with three projections and consequently three springs 28 are employed, and the arrangement of the springs is such as to yieldingly resist the movement of the drum in a counter-clockwise direction as when viewed in Figure 1. It is to be noted, however, that the inner periphery of the drum is formed with shoulders 26ª which form abutments adapted to engage the collar projections 22 for limiting the rotative movement of the drum in a counter-clockwise direction.

A casing 29 surrounds the drum 26, and interposed between the casing and drum is a brake band 30 carrying a liner 31 and having one end formed with a flange 32 abutting a shoulder 33 of a pocket 34, while the opposite end of the band is secured to a bolt 35 extending from the pocket and loosely through the casing, with nuts 36 threaded on its outer end and a spring 37 interposed between the nuts and the casing for exerting a tension on the brake band, which can be varied by an adjustment of the nuts. The casing is normally closed by a cover 38 removably secured in place by a bolt 39 and a nut 40 threaded on the end of the bearing member 18 which projects through an opening in the cover.

The casing 29 is provided with an integrally formed arm 41 connected to a bracket 42 secured to the axle 17 by means of a link 43. The connection of the ends of the link is made adjustable by means of nuts 44, and by means of the link connection it will be understood that the arm 41 is free to move downwardly from the position shown in Figure 1, but not upwardly from such position.

In operation, the several parts of the recoil mechanism occupy the position shown in Figure 1 when the vehicle frame is in normal position, but as the vehicle frame moves downwardly the casing 29 pivots around its pivotal connection at the outer end of the arm 41, and this movement causes a certain relative rotative movement of the casing, the brake band and its liner, the brake drum 26 and the collar 21, the brake drum and collar rotating in a clockwise direction, it being understood that the drum projections engage the collar projections to cause rotation of the collar with the drum, and that the collar is free to rotate on the bearing member because of the arrangement of ratchet teeth and dogs as previously described. Upon upward movement of the vehicle frame the casing 29 rotates in the opposite direction, tending to carry with it the brake drum 26. During the first part of this movement the drum yields to the rotative action of the casing until its shoulders 26ª abut the collar projections 22, when the dogs 24, in engaging the ratchet member 20, lock the collar against rotation and thus prevent further rotation of the drum, so that the brake liner is caused to have braking engagement with the periphery of the drum to retard the rotative movement of the casing 29. In this manner the upward movement of the vehicle frame is subjected to a graduated checking action which allows the vehicle body to rise to its normal elevation without jerking movement.

Although I have herein shown and described only one form of recoil mechanism embodying my invention, it is to be understood that various changes and modifications may be made herein without departing from the spirit of the invention and the spirit and scope of the appended claims.

I claim:

1. A recoil mechanism comprising a collar, means by which the collar is adapted for rotation in one direction only on a vehicle frame, a brake drum connected to the collar to rotate with the collar, yieldable means for resisting rotation of the drum in the opposite direction, and a braking element adapted for rotation and for connection with a vehicle axle to rotate in one direction or the other according as the vehicle frame moves upwardly or downwardly, said braking element having braking engagement with said drum.

2. A recoil mechanism comprising a collar, means by which the collar is adapted for rotation in one direction only on a vehicle frame, projections on the collar, a drum surrounding the collar and having projections co-operating with the collar projections to cause rotation of the collar with the drum in one direction, yieldable elements interposed between the collar and drum projections for yieldingly resisting rotative movement of the drum on the collar in the other direction, a braking element engaging the drum, and means by which the braking element is adapted to be connected to the axle of the vehicle so that as the vehicle frame moves upwardly or downwardly said element will be rotated in one direction or the other.

3. A recoil mechanism comprising a bearing member adapted to be fixed to a vehicle frame, a ratchet member fixed to the bearing member, a collar having dogs engaging the ratchet member in a manner to lock the collar against rotation on the member in one direction, projections on the collar, a drum surrounding the collar and having projections adapted to engage the projections of the collar to cause rotation of the collar with the drum in one direction, springs interposed between the collar and drum projections for yieldingly resisting rotation of the drum in the other direction, a braking element engaging the drum, and means by which said braking element is adapted to be connected to the axle of the vehicle so that as the vehicle frame moves upwardly or downwardly said element will be rotated in one direction or the other.

4. A recoil mechanism comprising a member adapted for rotative movement on a vehicle frame, a second member having braking engagement with the first member, means by which the second member is adapted to be connected to the axle of the vehicle so that as the vehicle moves upwardly or downwardly the second member will be rotated in one direction or the other, means for locking the first member against rotation in one direction so that as the vehicle frame moves upwardly the second member will have braking engagement with the first member to arrest the upward movement of the vehicle frame, and means for allowing movement of the first member in said direction relative to the locking means before the latter becomes effective, and acting to offer gradually increasing resistance to the upward movement of the frame, whereby the upward movement will be gradually checked.

5. A recoil mechanism comprising a member adapted for rotative movement on a vehicle frame, a second member having braking engagement with the first member, means by which the second member is adapted to be connected to the axle of the vehicle so that as the vehicle moves upwardly or downwardly the second member will be rotated in one direction or the other, means for locking the first member against rotation in one direction so that as the vehicle frame moves upwardly the second member will have braking engagement with the first member to arrest the upward movement of the vehicle frame, and yieldable means interposed between the first member and locking means for allowing movement of the first member in said direction before the locking means becomes effective, and acting to offer gradually increasing resistance to the upward movement of the frame, whereby the upward movement will be gradually checked.

CHARLES M. CRONKHITE.